(12) United States Patent
Williams et al.

(10) Patent No.: US 9,919,748 B2
(45) Date of Patent: Mar. 20, 2018

(54) VEHICLES WITH AERODYNAMIC SPOILER AND RETRACTABLE SENSING SYSTEMS

(71) Applicant: Toyota Motor Engineering & Manufacturing North America, Inc., Erlanger, KY (US)

(72) Inventors: Paxton S. Williams, Milan, MI (US); Danil V. Prokhorov, Canton, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 21 days.

(21) Appl. No.: 15/189,394

(22) Filed: Jun. 22, 2016

(65) Prior Publication Data

US 2017/0369106 A1 Dec. 28, 2017

(51) Int. Cl.
*B62D 35/00* (2006.01)

(52) U.S. Cl.
CPC ........ *B62D 35/00* (2013.01); *B60R 2300/301* (2013.01)

(58) Field of Classification Search
CPC .......................... B62D 35/00; B60R 2300/301
See application file for complete search history.

(56) References Cited

U.S. PATENT DOCUMENTS 3,689,695 A 9/1972 Rosenfield et al.
8,112,178 B2* 2/2012 Librojo Garing .... G05D 1/0246
  180/167
8,384,776 B2* 2/2013 Dolgov ................ G01C 21/20
  348/116
9,239,580 B2* 1/2016 Asahara ................ G05D 1/024
(Continued)

FOREIGN PATENT DOCUMENTS

CN 105083150 A 11/2015
DE 102012023577 A1 6/2014
(Continued)

OTHER PUBLICATIONS

Ford Testing Autonomous Fusion Hybrids In Snow, published Jan. 14, 2016, http://www.notey.com/external/7456549/ford-testing-autonomous-fusion-hybrids-in-snow-w-video-ford-videos-reports-autonomous-ford-fusion-ford-videos.html 2 pgs.

*Primary Examiner* — Lori L Lyjak
(74) *Attorney, Agent, or Firm* — Dinsmore & Shohl LLP (57) ABSTRACT

A vehicular sensing system, a vehicle and a method of performing one or both of vehicular mapping and navigating operations using the sensing system. The sensing system is secured to a roof or other suitable location on the vehicle and includes one or more sensors configured to acquire at least one of vehicular mapping and navigational data, a retractable mounting structure to move the sensor or sensors between a deployed and stowed position, and an aerodynamic spoiler, air dam or deflector. The body of the spoiler acts as a housing with a recess formed in its upper surface such that upon placement of the spoiler on the roof, the recess provides a location within the spoiler to permit storage of the mounting structure and sensors when they are in their deployed (non data-acquisition) mode of operation. The size and placement of the mounting structure and sensors is such that they do not detract from the aerodynamic or aesthetic qualities of the spoiler.

20 Claims, 4 Drawing Sheets

(56) References Cited

U.S. PATENT DOCUMENTS

2005/0121946 A1* 6/2005 McKnight ............ B60K 11/085
                                                                               296/180.1
2014/0084626 A1* 3/2014 Hori .................... B62D 35/007
                                                                               296/180.5

FOREIGN PATENT DOCUMENTS

| JP | 4006959 B2 | 11/2007 |
| JP | 2008155707 A | 7/2008 |

* cited by examiner

VEHICLES WITH AERODYNAMIC SPOILER AND RETRACTABLE SENSING SYSTEMS

TECHNICAL FIELD

The present specification generally relates to the use of sensors for vehicular mapping and navigation, more specifically, to roof-mounted vehicle sensing systems with retractable mounting structures that stow behind a roof-mounted spoiler when not in use.

BACKGROUND

Sensors such as lidar (light detection and ranging user laser light) can be used by vehicles to provide detailed 3D spatial information for the identification of objects near the vehicle, as well as the use of such information in the service of systems for vehicular mapping, navigation and autonomous operations. In order to be effective, these devices (which tend to be somewhat bulky) must be placed on locations on the vehicle that promote a wide and relatively unencumbered range of detection or field-of-view; such locations include the roof, hood or the like. Unfortunately, such placement can be both aerodynamically and aesthetically objectionable.

Accordingly, a need exists for alternative devices and methods for promoting the acquisition of mapping and navigation data for—among other things—autonomous vehicle operation without the drawbacks of conventional sensors and sensor-actuation componentry.

SUMMARY

In one embodiment, a sensing system for use on a vehicle is disclosed. The system includes one or more sensors configured to acquire vehicular mapping, navigational or related data. The system also includes a retractable mounting structure that can be used to selectively raise and lower the sensor or sensors depending on whether the vehicle to which the system is attached is in a data collection mode of operation or not. The system additionally includes a spoiler that houses the sensor and mounting structure. The spoiler is shaped to have an elongate dimension and an airflow dimension that are substantially transverse to one another so that the elongate dimension can be secured to the roof of the vehicle along a direction that is substantially transverse to the intended travel direction of the vehicle. The housing of the spoiler has a recess formed in its upper surface for stowed placement of the mounting structure and sensor. In this way, the cooperation between the spoiler, sensor and mounting structure permits selective movement of the sensor and the mounting structure between a stowed position and a deployed position. The system is compact enough to ensure that when the sensor and mounting structure are in the stowed position within the recess, the system defines a relatively unobtrusive profile that does not substantially alter the profile or contour of the spoiler, yet when placed in a deployed position permit the sensor to perform a data acquisition function commensurate with mapping or navigational operations, does so with an automated, simple mechanical movement. By using small (i.e., miniaturized) sensors, the mounting structure may be made up of correspondingly small linkage structure for placement into the housing recess.

In another embodiment, a vehicle is disclosed. The vehicle includes a wheeled chassis with a passenger compartment, a motive power unit, a guidance apparatus cooperative with the wheeled chassis and motive power unit and a vehicular sensing system. The sensing system includes one or more sensors configured to acquire at least one of vehicular mapping and navigational data, as well as a retractable mounting structure secured to a spoiler that is mounted or otherwise secured to the vehicle roof. The spoiler is shaped to have an elongate dimension and an airflow dimension that are substantially transverse to one another so that the elongate dimension extends along a direction that is substantially transverse to the travel direction of the vehicle. The spoiler also acts as a housing for the mounting structure and sensors through a recess formed in its upper surface. In this way, the cooperation between the spoiler, sensor and mounting structure permits selective movement of the sensor and the mounting structure between a stowed position and a deployed position.

In yet another embodiment, a method for performing at least one of vehicular mapping and vehicular navigation is disclosed. The method includes securing movement and data-acquisition components to a spoiler that is mounted or otherwise secured to the roof of the vehicle. As such, the data-acquisition components and spoiler make up a sensing system such that when one or more sensors that make up a part of system are in a deployed position, the sensor can operate in its intended data-acquisition mode, and when the sensor is in a stowed position, it is situated within the recess. The method additionally includes acquiring at least one of mapping data and navigational data through the sensor when the system is in the deployed condition. The spoiler is made up of a housing with an elongate dimension and an airflow dimension that are substantially transverse to one another. A recess formed in the housing's upper surface permits selective movement between the stowed position and the deployed position such that when the mounting structure and the one or more sensors are stowed within the recess, they define a substantially unobtrusive profile relative to the spoiler. In this way, the aerodynamic features made possible by the spoiler contour are substantially unaffected by the presence of the stored sensors and mounting structure.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally related to vehicles that are equipped with sensing systems (alternatively referred to as perception systems) for selectively acquiring mapping or navigational data through the use of a retractable mounting structure that moves lidar or related sensors between stowed and deployed positions. By integrating the structure that is used to selectively deploy the sensors into the spoiler, air dam, deflector or related airfoil that is mounted at or near the leading edge of the roof of the vehicle, aerodynamic and aesthetic limitations that are associated with the use of a traditional mapping or navigational data sensing system may be overcome. This system may be used to operate the vehicle at least partially in response to the acquired mapping and navigational data. More particularly, such operation of the vehicle may include autonomous vehicle operation.

Figure 1:
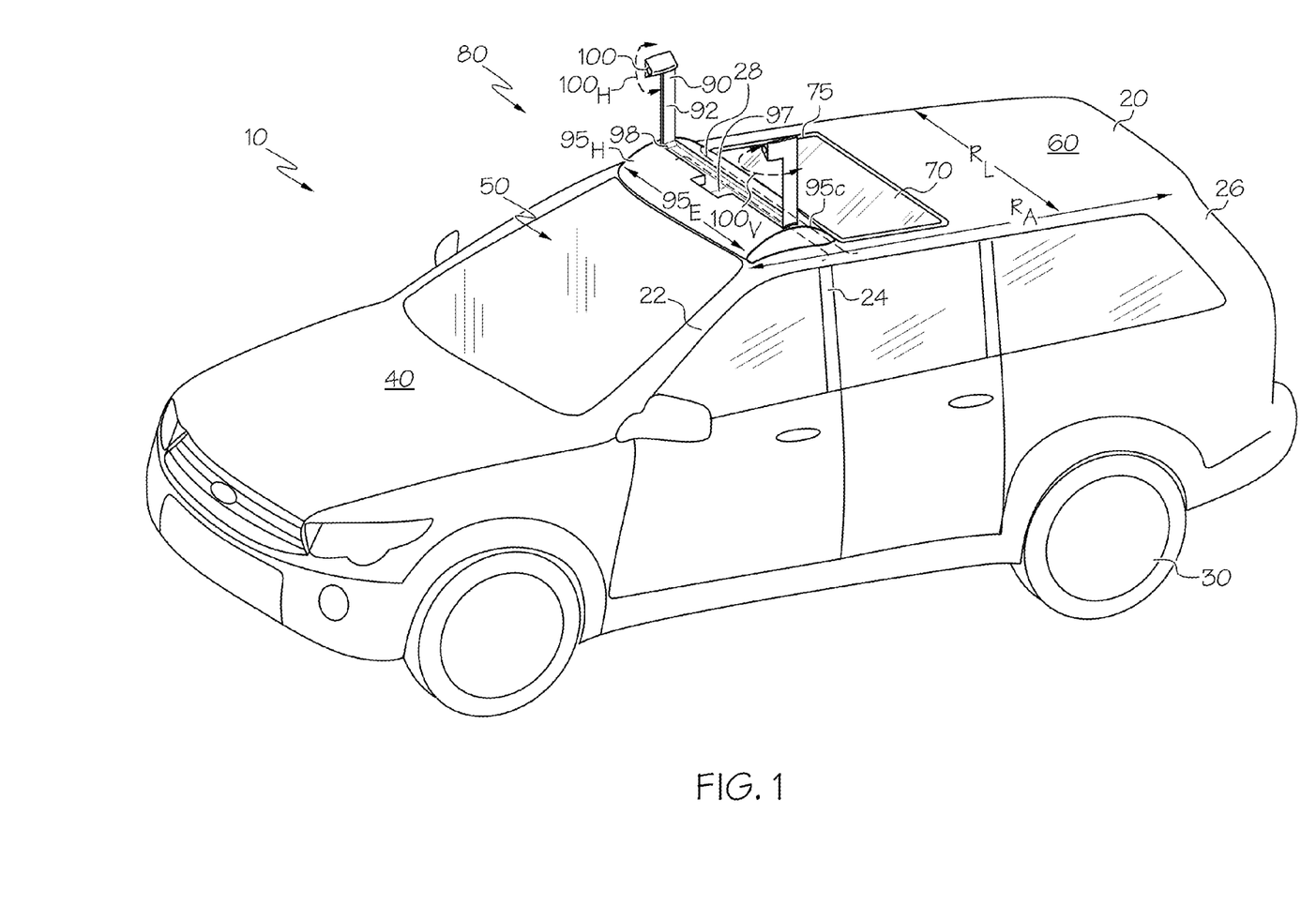
FIG. 1 depicts a perspective view of a vehicle with a sensing system in a deployed position according to one embodiment as described herein.
Figure 2:
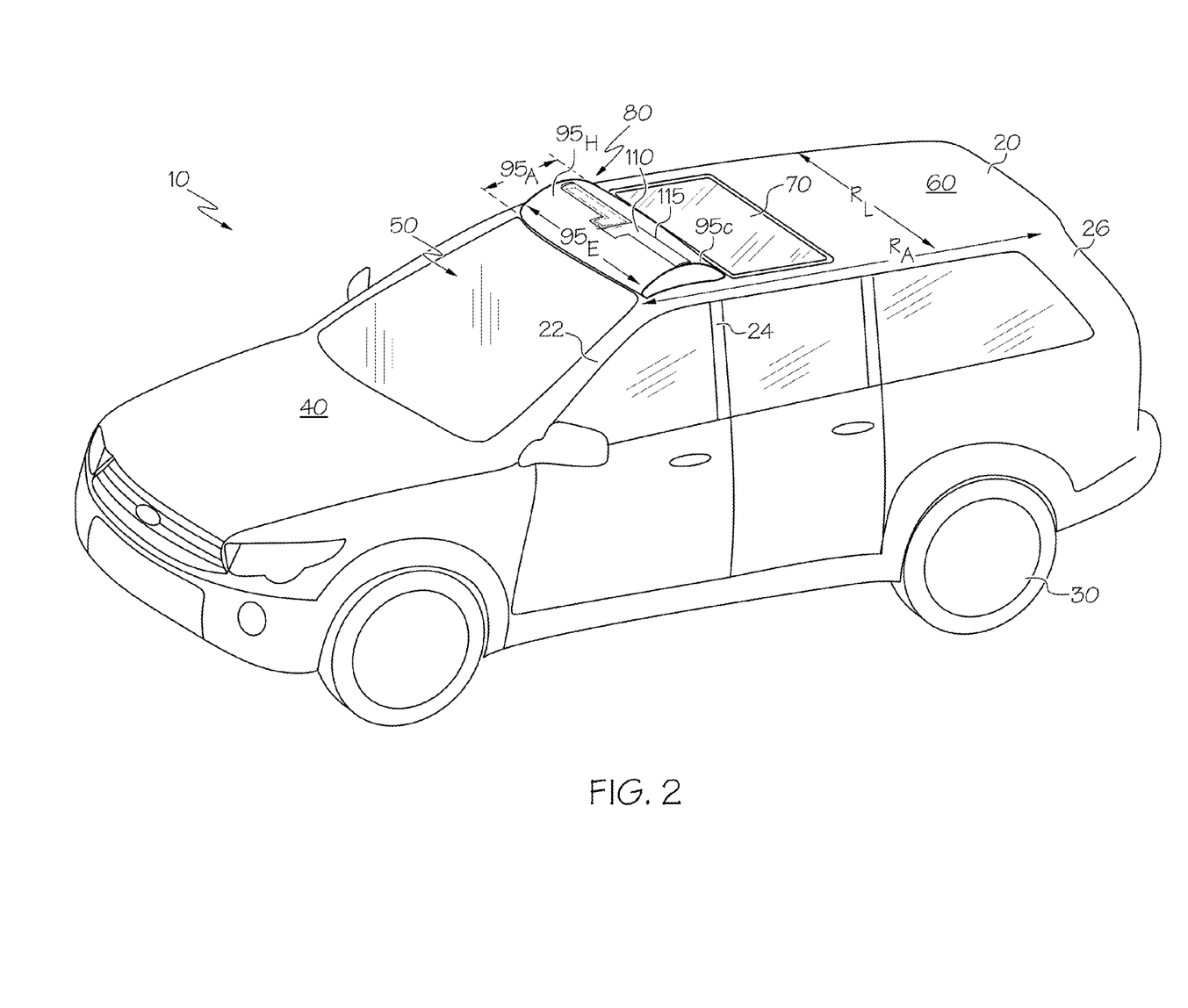
FIG. 2 depicts the vehicle and sensing system of FIG. 1 when the sensing system is in a stowed position.

Referring first to FIGS. 1 and 2, a vehicle 10 includes a chassis 20 with a plurality of wheels 30. Chassis 20 may either be of body-on-frame or unibody construction, and both configurations are deemed to be within the scope of the present disclosure. A motive power unit 40 such as a conventional internal combustion engine (ICE), battery pack, fuel cell stack or a hybrid combination of one or more of the above may be situated in or on the chassis 20 to provide propulsive power to the vehicle 10. As shown, the motive power unit 40 is situated underneath a hood that is placed at the fore end of vehicle 10. A passenger compartment 50 is formed inside the chassis 20 and serves not only as a region to transport passengers and cargo, but also as a place from which a driver may operate vehicle 10. A guidance apparatus (which may include, among other things, steering wheel, transmission, accelerator, brakes or the like) is used in cooperation with the wheels 30, motive power unit 40 and other systems to control movement of the vehicle 10.

A generally planar roof 60 defines a closure surface with contours along lateral and axial rooflines $R_L$ and $R_A$ at the top of vehicle 10. As can be seen, the lateral dimension is substantially transverse to the intended travel direction of vehicle 10, while the axial dimension is substantially collinear with the intended travel direction of vehicle 10. In some embodiments, the roof 60 may include periodic longitudinal ridges or lateral side downward tapering (neither of which are shown) for structural, aerodynamic or aesthetic reasons; none of these features detract from the fact that the roof 60 is mostly planar in both its side-to-side and front-to-back dimensions that correspond to the lateral and axial rooflines $R_L$ and $R_A$. While the closure surface defined by lateral and axial rooflines $R_L$ and $R_A$ is illustrated as being generally planar, it may have one or more non-planar (i.e., curvilinear or arcuate) regions, features or both. Both planar and non-planar variants are within the scope of the present disclosure.

In some embodiments of vehicle 10, the roof 60 may include one or more sunroofs 70 formed therein. In such configuration, the sunroof 70, which is preferably made from glass or an optically transparent synthetic resin, defines a substantially planar form that can mimic the shape of the roof 60 around it. In the present context, the term "sunroof" is meant to encompass any selectively deployable structure formed in the roof 60 of vehicle 10 that permits one or both of visual and open-air access between the passenger compartment 50 and the ambient environment.

In some embodiments, the sunroof 70 can be opened and closed either manually or electrically, the latter by the operation of a motor and series of gears, pivots, slots and pins as understood by those skilled in the art. In some embodiments, the sunroof 70 moves along a path dictated by longitudinally-extending guide rails (not shown) that are part of a sunroof housing that is formed underneath the roof 60 and integrated within structural elements that may make up a portion of the chassis 20. Examples of such structural elements include A-pillars 22, B-pillars 24, C-pillars 26, crossbar 28 structure, as well as a roof rails, roof bows, or the like (the latter of which are not shown). In some embodiments, a weather strip is situated on the four peripheral side edges of the sunroof 70 in order to form a hermetic seal 75 when the sunroof 70 is in its closed position. Likewise, a roof recess 65 (which may also house a rain channel and other equipment, as well as a location with which to mount the sunroof 70 rails and related supporting structure) may be formed around the periphery of the opening in the roof 60 where the sunroof 70 is placed.

Figure 3:
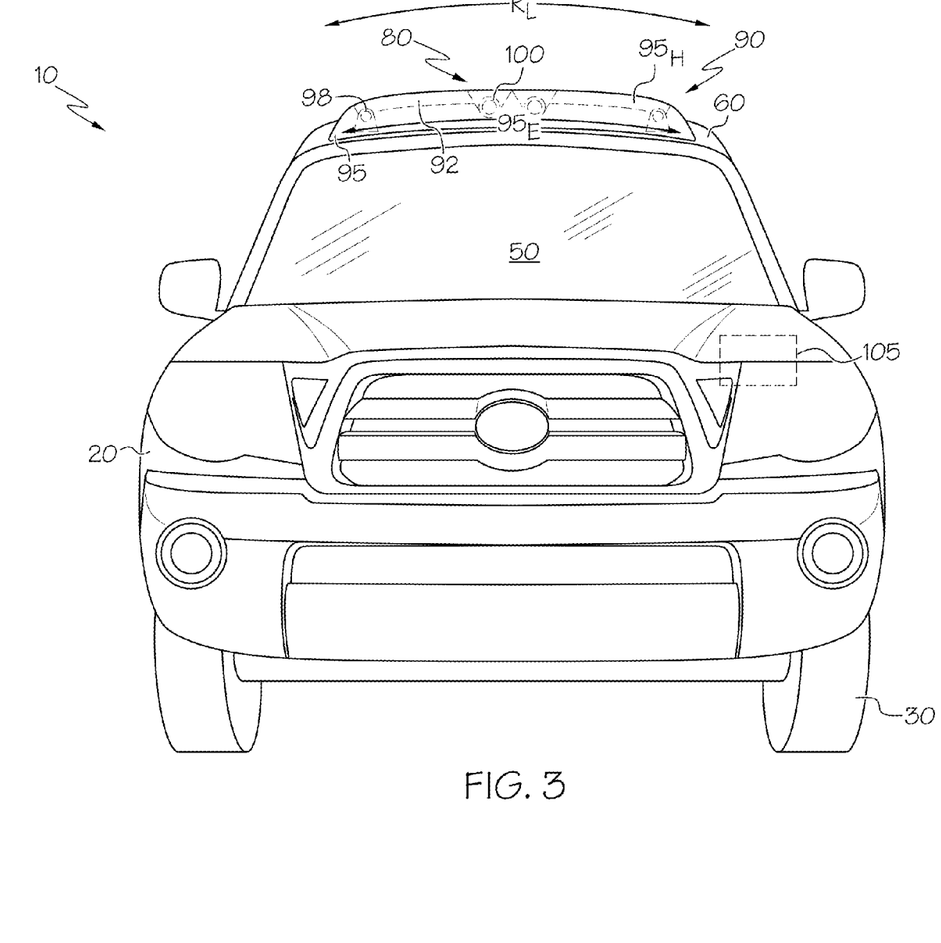
FIG. 3 depicts a front elevation view of the vehicle and sensing system of FIG. 2.

Referring next to FIG. 3 in conjunction with FIGS. 1 and 2, in one embodiment, the sensing system 80 is made up of at least a retractable mounting structure 90, a spoiler 95 and one or more sensors 100. The spoiler 95 is formed across at least a portion of the width of the roof 60 that corresponds to the lateral $R_L$ and defines a generally aerodynamic (i.e., airfoil) shape with an elongate dimension $95_E$ and an airflow dimension $95_A$ that are substantially transverse to one another. Thus, the spoiler 95 has its elongate dimension $95_E$ that is substantially collinear with the lateral roofline $R_L$. In one form, the spoiler 95 may be made from a rigid plastic material, while in others, it may be made from a metal, composite or other suitable structural material. Furthermore, spoiler 95 is constructed as a housing $95_H$ for other components due to its ability to be formed from a hollow shell construction. In such construction, the housing $95_H$ may also be the primary load-bearing structure for spoiler 95. In this way, the significant hollow volume that is formed between the shell can be used to house other components, such as actuators like motor M and gears G Likewise, the outer shell can be readily formed into a suitable shape to provide the intended aerodynamic contour $95_C$. Moreover, a recess 97 (as shown with particularity in FIG. 1) may be formed in the housing $95_H$ of spoiler 95. This recess 97 defines a trough-like region into which the mounting structure 90 and sensors 100 may be placed.

The placement of the spoiler 95 as part of the sensing system 80 is such that when mounted to the roof 60, it is at a position that is closer than the sunroof 70 to the front of the vehicle 10. The placement of the spoiler 95 axially upstream of the sunroof 70 helps to promote more desirable airflow patterns over the roof 60 in general, and in particular over the aperture that is present in the roof 60 when the sunroof 70 is in an open position. Such desirable airflow patterns are particularly advantageous during such open positions in that they help to reduce motion-induced wind noise that may otherwise be present in the passenger compartment 50.

Referring again to FIG. 1, the sensing system 80 is shown in its deployed mode, where the retractable mounting structure 90 is configured as a kinematic assembly that moves within the recess 97. Within the present context, a kinematic assembly is a collection of one or more of trusses, rods, arms, cams, pivots, sliders, rollers, springs, gears or motors that when used in cooperation with one another can affect the selective movement of the sensing system 80 discussed herein. In such context, any reference to a linkage or related structure embodies at least a subset of some of these components working in conjunction with one another to bring about such selective movement. Because the recess 97 may be formed in the housing $95_H$ that is above the closure surface that is defined by the rooflines $R_L$ and $R_A$, the kinematic assembly needed to move the mounting structure 90 and sensors 100 between their deployed and stowed positions may be housed in one or more of its hollow cavities, thereby avoiding the necessity of placing it in the roof recess 65, where it could otherwise detract from already-limited amount of usable space.

In one embodiment, the mounting structure 90 is constructed to have purely pivoting movement between the stowed and deployed positions, as shown with the use of pivot (also referred to as pivot pins) 98. In another embodiment (not shown), the mounting structure 90 may be constructed as a slider-crank variant of a four-bar linkage, where a longitudinal groove that acts as a prismatic joint that is formed in the housing $95_H$ functions as a slider along which the truss 92 that acts as the driver or crank can rotate and translate. In addition, the truss 92 that forms the mounting rod or pole for sensors 100 may act as the connecting rod floating link. In a variation, the truss 92 that makes up the mounting rod of the mounting structure 90 may define a telescoping structure for additional deployed extension of sensors 100. In yet another embodiment, the mounting structure 90 may include other forms of construction (such as a scissor-truss or the like) in order to promote the selective deployment of the sensors 100 without having an unduly long profile when the sensing system 80 is placed in a stowed position. Significantly, all of these forms of construction can utilize relatively thin, substantially flat or cylindrical trusses 92 as a way to further ensure that the sensing system 80 is sized and shaped to fit within recesses 65 formed in the roof 60. It will be appreciated that all of the aforementioned forms of mounting structure 90 construction and operation are within the scope of the present disclosure.

The one or more sensors 100 are secured along the mounting structure 90 such that upon having the sensing system 80 lifted up in to the deployed position shown in FIG. 1, the sensors are in an elevated height-wise position relative to vehicle 10, thereby allowing them a less-encumbered view of the road or related terrain from which mapping or navigation data is being acquired. Although shown as being secured to the remote end of the truss 92 from where such structure is pivotably secured to the roof 60 or sunroof housing, it will be appreciated that the sensors 100 may be placed anywhere along the length of the truss 92. Moreover, there may be more than one sensor 100 on truss 92, as well as more than one type (i.e., lidar, radar, optical or the like) of sensor 100, and that all such variants are deemed to be within the scope of the present disclosure. Lidar may offer suitable detection ranges (often up to 200 to 250 meters or more) and increased angular resolution that can be particularly well-suited to automotive applications where horizontal or vertical position identification of objects in the road may be performed with greater precision. Lidar may recognize size differences among identified objects, including those from a comparable distance and relative speed. This in turn can allow algorithms that act on the sensed data to draw more accurate conclusions about the type of object within the field of view of sensor 100, especially when the algorithms or software need to compress the three-dimensional data associated with a vehicle 10 in motion into a two-dimensional image suitable for displaying. In addition, lidar sensors can usually be produced at lower costs than comparable devices that operate in other bands within the electromagnetic spectrum.

Examples of the use of sensor data in the pursuit of mapping and navigational operations include U.S. Pat. No. 8,112,178 entitled ROBOTIC PLATFORM FOR AUTONOMOUS AUTOMOTIVE VEHICLE DEVELOPMENT, U.S. Pat. No. 8,384,776 entitled DETECTION OF TOPOLOGICAL STRUCTURE FROM SENSOR DATA WITH APPLICATION TO AUTONOMOUS DRIVING IN SEMI-STRUCTURED ENVIRONMENTS, U.S. Pat. No. 9,062,977 entitled NAVIGATION OF ON-ROAD VEHICLE BASED ON OBJECT REFERENCE DATA THAT IS UPDATED and U.S. Pat. No. 9,239,580 entitled AUTONOMOUS MOBILE ROBOT, SELF POSITION ESTIMATION METHOD, ENVIRONMENTAL MAP GENERATION METHOD, ENVIRONMENTAL MAP GENERATION APPARATUS, AND DATA STRUCTURE FOR ENVIRONMENTAL MAP, all of which are incorporated herein by reference.

Referring with particularity to FIG. 3, the sensors 100 define a relatively small package such that upon stowing the sensing system 80 into the spoiler 95, the mounting structure 90 and sensors 100 are completely nested. These significant miniaturization features can be employed, regardless of whether they operate within the optical, infrared, microwave or other bands within the electromagnetic spectrum. Furthermore, the aforementioned relatively small volume of the mounting structure 90 and sensors 100 means that they may be partially or even substantially completely contained within the recess 97 when the sensing system 80 is in its stowed position. Spring-loading or actuator-based pivoting rotation of each of the sensors 100 relative to the truss 92 or other components may be used to permit the angle of the deployed sensors 100 to be varied about at least horizontal $100_H$ and vertical $100_V$ axes as a way to increase their data acquisition capability. In addition to providing for improved fit, finish, aesthetic and aerodynamic integration of the sensing system 80 into spoiler 95, its stowage into recess 97 also helps to minimize exposure of the sensitive components to inclement weather, damage, vandalism or the like.

In some embodiments, the sensors 100 are lidar sensors that operate in the infrared band to perform laser imaging, and may include (among other components) an optical beam transmitter, optical detector, beam alignment device, optical filter and spectrometer. Sensors 100 can be signally coupled to a microprocessor-based controller 105 (shown notionally as being within the same compartment that houses the motive power unit 40 but understood to be placeable within any suitable location of vehicle 10) to coordinate data acquisition and storage, as well as overall system 80 operation. In one embodiment, the sensors 100 may be made to emit a series of focused, low-power beams, as well as to detect and record their reflection off of various objects. By capturing and evaluating lidar data over time, the data acquired by the sensors 100—which operates in conjunction with the controller 105—may be built up into a representation of objects and their relative positions to the vehicle 10. This in turn may be used to generate vehicular mapping and navigational data. As will be appreciated, sensors 100 may include mixed modes of data acquisition. Thus, while some of sensors 100 may be laser-based lidars operating in the infrared band, others may be cameras operating in the optical band. In such a system, the images acquired from each different type of sensor 100 may be compared with one another through algorithms operating on the controller so that a more complete map or related rendering of the road being traversed may be ascertained. All such variants are deemed to be within the scope of the present disclosure.

Controller 105 may be a digital computer that in addition to having a processing unit, also has an input, an output, and memory that can temporarily or permanently store such a code, program or algorithm in the computer's memory such that the instructions contained in the code are operated upon by the processing unit based on input data. In this way, output data generated by the code and the processing unit can be conveyed to another component (such as sensing system 80), program or a user via output. In one form, a data-containing portion of the memory (also called working memory) is referred to as random access memory (RAM), while an instruction-containing portion of the memory (also called permanent memory is referred to as read only memory (ROM)). A data bus or related set of wires and associated circuitry forms a suitable data communication path that can interconnect the input, output, CPU and memory, as well as sensing system 80 or any peripheral equipment in such a way as to permit the system to operate as an integrated whole. In this way, controller 105 may be configured as a computer system based on a von Neumann architecture so that it may perform one or more specific automated steps outlined in this disclosure. As such, controller 105 becomes a particularly-adapted computer or computer-related data processing device that employs the salient features of such an architecture in order to perform at least some of the data acquisition, manipulation, actuation, control or related computational functions. It will be appreciated by those skilled in the art that computer-executable instructions that embody operations discussed elsewhere in this disclosure can be placed within an appropriate location (such as the aforementioned memory) within controller 105 in order to achieve the objectives set forth in the present disclosure.

Data acquired from the sensors 100 is routed through a bus or other suitable signal communication line to the controller 105 or related a computing device that may be outfitted with one or more processors and memory for storing data and program instructions that are used by processors. Algorithms (such as those associated with a particular application program) are stored in the controller memory and acted upon by the processors. In addition to the sensors 100, the sensing system 80 may use an inertial measurement unit (IMU), global navigation satellite system (GNSS) or the like to collect information specific to the environment surrounding vehicle 10; such addition information may include that associated with other objects in or around the vehicle's travel path, such as other vehicles, buildings, landmarks, pedestrians, animals or obstacles. Likewise, measurements may be taken by the sensing system 80 to check for elevation changes in the road and other data needed to perform its mapping or navigation functions. In an autonomous mode of operation, the controller 105 is used to navigate the vehicle 10 over a road or other suitable surface based on information acquired by the sensing system 80. In such mode, the controller 105 at least partially provides operating instructions to the motive power unit 40 and the guidance apparatus.

Figure 4:
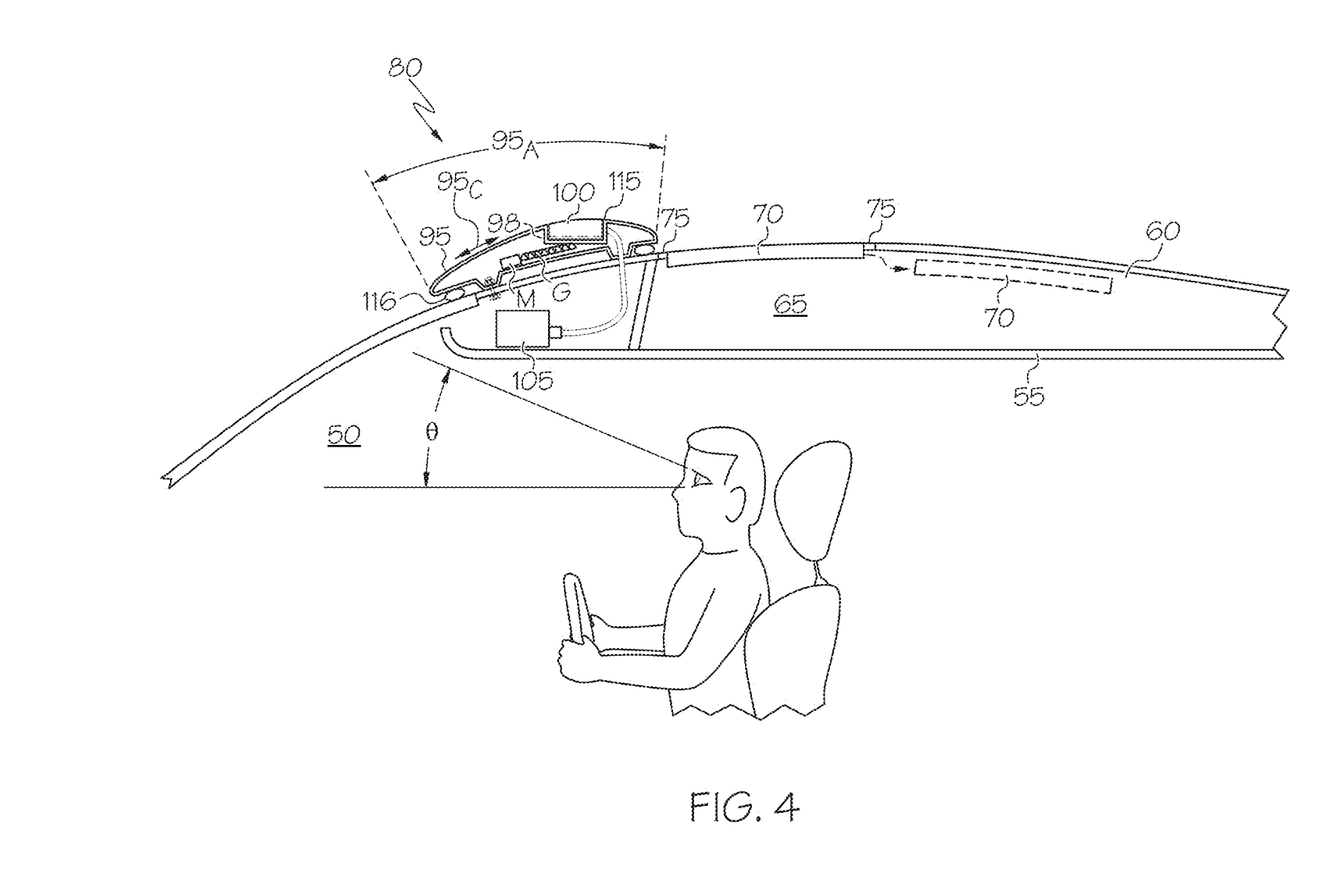
FIG. 4 depicts a side cutaway elevation view of the vehicle and sensing system of FIG. 2.

Referring next to FIG. 4 in conjunction with FIG. 2, when the vehicle 10 is in a data acquisition mode, the mounting structure 90 can be deployed (such as through the operation of a motor M and gear train G, both as shown in FIG. 4, as well as with springs or other biasing members to have the sensors 100 pop up out of the roof 60 in the manner shown in FIG. 1. While in their deployed position, the one or more sensors 100 are extended away from the spoiler 95 to define a data-acquisition mode of operation in order to achieve their mapping or navigational functions, and when the mounting structure 90 and sensors 100 of system 80 is in its stowed position within the recess 97 formed in the spoiler 95, both the sensor 100 and mounting structure 90 define a substantially flush profile across the portion of the recess 97. Within the present context, a substantially flush profile is formed by the mounting structure 90 and sensors 100 relative to the spoiler 95 such that when the formers are in their stowed position within the recess 97 of the latter—in being viewed from a front or side elevation of the vehicle 10—there appears to be no significant discontinuities, gaps, protuberances or other undulations relative to the generally continuous profile of the intended aerodynamic contour $95_C$ of spoiler 95. In such context, seams (including those seams that are filled by seals 115) that are visible are not violative of such substantially flush profile so long as they result in a gap no wider than necessary to perform their sealing function. Thus, any seam formed at the point of adjacent abutment between such surfaces would be deemed to be within the present meaning of a substantially flush profile so long as it does not result in a gap that is wider than it need be in the course of commonly-accepted vehicular fit and finish. Regardless of the precise aerodynamic contour $95_C$ of spoiler 95, the construction of the sensing system 80 is such that when the mounting structure 90 and sensors 100 are stowed, the view across or along the aerodynamic contour $95_C$ defines an aesthetically-pleasing and aerodynamically unobtrusive profile.

Referring back to FIGS. 1 and 2 in conjunction with FIG. 3, this flush profile is enhanced by the presence of fairings 110 which are used predominantly when the sensing system 80 is in the stowed position of FIG. 2. In particular, the fairings 110 define a relatively thin and generally planar rectangular member that upon retraction of the sensing system 80 into the recess 97, provide a smooth, continuous upper surface for spoiler 95. In some embodiments, the fairings 110 may be made of a similar material to that of the remainder of the housing $95_H$, and can be painted to match colors. Likewise, the fairings 110 may be rigid enough to withstand loads, particularly in the form of wind loads when sensing system 80 is deployed. Taken in conjunction with one another, the use of the fairings 110 and the small size of the mounting structure 90 and sensors 100 give the sensing system 80 a relatively unobtrusive volumetric profile that is stowed between the roof 60 and passenger compartment 50 during periods where the sensors 100 are not in operation so that the outer dimension of the roof 60 and its related aesthetic attributes are not altered. Although not shown, the fairings 110 may include ether hinges, apertures or portions that are transparent to the particular wavelength of interest so that the sensor 100 can perform its emitting and detecting functions during deployment while still preserving a substantially closed, sealed closure of the sensing system 80 during stowage.

Additionally, seals 115 may be disposed around the periphery that is defined by the fairings to further promote a substantially water-tight, aesthetically-pleasing roof profile during such times as when the assembly of the sensing system 80 is in the stowed position. These seals 115 perform similar hermetic functions to those of the seals 75 that are formed around sunroof 70.

In some embodiments, the fairings 110 may be secured directly to the housing $95_H$ in order to perform their covering function. In such configurations, hinges or related pivots similar to pivots 98 may be formed between the roof 60 and fairings 110 such that upon deployment of the sensing system 80, the fairings 110 rotate away from the roof 60 at the hinge point. Such movement may be achieved through any suitable actuation system, including motor-and-gear driven, hydraulic or pneumatic variants, and coupled to controller 105 such that their opening and closing may be made to correspond with the respective deploying and stowing movements of the sensing system 80.

In some embodiments, the fairing 110 may be formed as an integral part of the truss 92 rather than being merely attached to it. In such construction, the fairing 110 can be sized and shaped to provide both adequate levels of structural integrity to the mounting structure 90, as well as the requisite degree of coverage of the recess 65 in order to ensure the substantially continuous, flush profile between the adjacent surfaces of the sensing system 80 and roof 60.

Referring again to FIG. 4, a side cutaway elevation view of the vehicle 10 and sensing system 80 of FIG. 2 when the sensing system 80 is in a stowed position shows that the size of the mounting structure 90 and sensors 100 is small enough to fit within the empty volume defined within the housing $95_H$. In some embodiments, the sensors 100 define a small volumetric profile of no more than about 2 to 3 inches in each of the height, width and thickness dimensions. This miniaturization of the actual sensing capability can provide the sensing system 80 with a small profile (and the small associated weight) so that the rods, trusses 92 or related bar-like members of the mounting structure 90 can be kept thin while still having sufficient rigidity to perform their deployment functions. In addition to having various roof 60 structural elements (such as the pillars, rails, bars or the like mentioned above) that may form a suitably rigid hard point for operation of the spoiler 95 as well as the mounting structure 90 and sensors 100 that are disposed therein, other mounting elements 116 may serve to provide secure mounting of spoiler 95 to the roof 60, as well as form (if necessary) a substantially water-tight seal and vibration isolation functions. One particular area of roof-mounting interest for the sensing system 80 is in the upper corner of the roof 60 that is near the A, B or C-pillars 22, 24 or 26, where the reinforcements share the flange with the windshields. The selective raising and lowering of the sensing system 80 may be actuated by a motor M and one or more gears G that are stowed in the recess between the roof 60 and the headliner 55 of the passenger compartment 50. In one preferred form, the gears G may be in the form of a worm gear that is rotatably coupled to an output shaft formed on motor M.

Certain portions of data-collecting during modes of operation of the sensing system 80 may be performed while the vehicle 10 is moving. For example, as the vehicle 10 traverses a highway or other road, the sensor or sensors 100 may collect large amounts of data (often in excess of 700,000 data points per second).

Significantly, because the sensing system 80 is mounted on top of the roof 60, its presence does not result in a further vertically-downward encroachment on the passenger compartment 50. As such, the look up angle θ for the driver may be maintained from being compromised, as well as to not have a headliner 55 lowered to accommodate the sensing system 80. Controller 105 is shown placed in an alternate location relative to that of FIG. 3; it will be appreciated that either placement is within the scope of the present disclosure.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicular sensing system comprising:
   a spoiler defining a housing with an elongate dimension and an airflow dimension that are substantially transverse to one another, the spoiler configured to have its elongate dimension be secured along at least a portion of a lateral distance across a roof of a vehicle, the housing defining at least one recess formed in an upper surface thereof such that upon placement of the spoiler on the roof, the at least one recess extends substantially along the elongate dimension;
   at least one sensor configured to acquire at least one of vehicular mapping and navigational data; and
   a retractable mounting structure cooperative with the at least one sensor and secured to the spoiler to permit selective movement between a stowed position and a deployed position such that when the mounting structure and the at least one sensor are in their deployed position, the at least one sensor is located outside of the recess to define a data-acquisition mode of operation, and when the mounting structure and the at least one sensor are in their stowed position, both the mounting structure and the at least one sensor are situated within the recess.

2. The system of claim 1, wherein the mounting structure and the at least one sensor define a substantially flush profile along the airflow dimension of the spoiler when the mounting structure and the at least one sensor are in their stowed position.

3. The system of claim 1, wherein the mounting structure and the at least one sensor do not project above a contour formed along the airflow dimension of the spoiler when the mounting structure and the at least one sensor are in their stowed position.

4. The system of claim 1, wherein the at least one sensor comprises at least one lidar sensor.

5. The system of claim 1, wherein the mounting structure comprises a linkage that is pivotably cooperative with the housing through at least one hinge.

6. The system of claim 5, wherein the linkage is movably responsive to the operation of at least one motor and at least one gear that is mounted within the housing.

7. The system of claim 1, further comprising a fairing cooperative with the recess, the mounting structure and at least one sensor such that when the mounting structure and at least one sensor are in their stowed position, the fairing substantially covers the mounting structure, the at least one sensor and the recess.

8. The system of claim 7, wherein the fairing is affixed to at least one of the mounting structure and at least one sensor with a size and shape such that when the mounting structure and at least one sensor are in their stowed position, the fairing defines a substantially flush profile along the housing upper surface.

9. The system of claim 7, further comprising a seal disposed between the fairing and the recess.

10. A vehicle comprising:
    a wheeled chassis defining a passenger compartment therein with a roof disposed thereover;
    a motive power unit;
    a guidance apparatus cooperative with the wheeled chassis and motive power unit; and
    a vehicular sensing system comprising:
       a spoiler defining a housing with an elongate dimension and an airflow dimension that are substantially transverse to one another, the spoiler configured to have its elongate dimension be secured along at least a portion of a lateral distance across the roof of a vehicle, the housing defining at least one recess formed in an upper surface thereof such that upon placement of the spoiler on the roof, the at least one recess extends substantially along the elongate dimension;

at least one sensor configured to acquire at least one of vehicular mapping and navigational data; and a retractable mounting structure cooperative with the at least one sensor and secured to the spoiler to permit selective movement between a stowed position and a deployed position such that when the mounting structure and the at least one sensor are in their deployed position, the at least one sensor is located outside of the recess to define a data-acquisition mode of operation, and when the mounting structure and the at least one sensor are in their stowed position, both the mounting structure and the at least one sensor are situated within the recess.

11. The vehicle of claim 10, wherein the at least one sensor comprises at least one lidar sensor.

12. The vehicle of claim 10, wherein the mounting structure comprises:
   a linkage that is pivotably cooperative with the recess through at least one hinge; and
   an actuation mechanism cooperative with the linkage such that upon operation of the actuation mechanism, the linkage moves between the deployed and stowed positions.

13. The vehicle of claim 10, further comprising a fairing cooperative with the recess, the mounting structure and at least one sensor such that when the mounting structure and at least one sensor are in their stowed position, the fairing substantially covers the mounting structure, the at least one sensor and the recess.

14. The vehicle of claim 13, wherein the fairing is affixed to at least one of the mounting structure and at least one sensor with a size and shape such that when the mounting structure and at least one sensor are in their stowed position, the fairing substantially defines a substantially flush profile along the housing upper surface.

15. The vehicle of claim 13, further comprising a seal disposed between the fairing and the recess.

16. The vehicle of claim 10, further comprising a sunroof situated within a portion of the roof such that the airflow dimension of the spoiler is disposed upstream of and substantially collinear with an axial roofline that is defined in the roof.

17. A method for performing at least one of vehicular mapping and vehicular navigation, the method comprising:
   securing a sensing system to a roof of a vehicle, the sensing system comprising:
      a spoiler defining a housing with an elongate dimension and an airflow dimension that are substantially transverse to one another, the spoiler configured to have its elongate dimension be secured along at least a portion of a lateral distance across the roof of a vehicle, the housing defining at least one recess formed in an upper surface thereof such that upon placement of the spoiler on the roof, the at least one recess extends substantially along the elongate dimension;
      at least one sensor configured to acquire at least one of vehicular mapping and navigational data; and
      a retractable mounting structure cooperative with the at least one sensor and secured to the spoiler to permit selective movement between a stowed position and a deployed position;
   moving the system between a stowed position and a deployed position such that when the mounting structure and the at least one sensor are in their deployed position, the at least one sensor is located outside of the recess to define a data-acquisition mode of operation, and when the mounting structure and the at least one sensor are in their stowed position, both the mounting structure and the at least one sensor are situated within the recess; and
   acquiring at least one of mapping data and navigational data through the at least one sensor when the system is in the deployed condition.

18. The method of claim 17, wherein the sensing system further comprises a fairing cooperative with the recess, the mounting structure and at least one sensor such that when the mounting structure and at least one sensor are in their stowed position, the fairing defines a substantially flush profile along the housing upper surface.

19. The method of claim 17, further comprising operating the vehicle at least partially in response to the at least one of the acquired mapping data and navigational data.

20. The method of claim 19, wherein the operating the vehicle comprises autonomous vehicle operation.

* * * * *